United States Patent [19]

Cady

[11] Patent Number: 4,457,196

[45] Date of Patent: Jul. 3, 1984

[54] PUNCH PRESS ASSEMBLY INCLUDING A PRELOADED ENCAPSULTED SPRING

[75] Inventor: Percy L. Cady, Attica, N.Y.

[73] Assignee: Houdaille Industries, Inc., Ft. Lauderdale, Fla.

[21] Appl. No.: 440,551

[22] Filed: Nov. 10, 1982

Related U.S. Application Data

[63] Continuation-in-part of Ser. No. 216,631, Dec. 17, 1980, abandoned, which is a continuation-in-part of Ser. No. 106,832, Dec. 26, 1979, abandoned.

[51] Int. Cl.³ .............................................. B26F 1/14
[52] U.S. Cl. ...................................... 83/140; 83/588; 83/640; 83/700
[58] Field of Search ................. 83/138, 139, 140, 141, 83/142, 143, 146, 698, 700, 640, 136, 145, 588

[56] References Cited

U.S. PATENT DOCUMENTS

| | | | |
|---|---|---|---|
| Re. 29,950 | 4/1979 | Bartha | 83/143 X |
| 1,546,164 | 7/1925 | Bluhm | 267/60 |
| 1,681,192 | 8/1928 | McBride | 267/170 |
| 1,689,662 | 10/1928 | Bell et al. | |
| 1,897,836 | 2/1933 | Bristol | |
| 1,909,478 | 5/1933 | Wilson | |
| 1,955,866 | 4/1934 | Wales | |
| 2,334,138 | 11/1943 | Wales | 83/140 |
| 2,340,335 | 2/1944 | Marsh | |
| 2,382,249 | 8/1945 | Megar | |
| 2,571,449 | 10/1951 | Hobbs | |
| 2,579,641 | 12/1951 | Aldrich | 83/140 |
| 2,842,355 | 7/1958 | Lang | |
| 2,908,512 | 10/1959 | Morrow | 29/508 X |
| 2,957,236 | 10/1960 | Kreuchen | 29/511 X |
| 3,211,468 | 10/1965 | Flowers | 267/20 R X |
| 3,408,731 | 11/1968 | Mercier | 29/511 |
| 3,467,414 | 9/1969 | Downing | 29/508 X |
| 3,585,698 | 6/1971 | Kamper | 29/173 X |
| 3,670,405 | 6/1972 | Dochterman | |
| 3,756,261 | 9/1973 | Minchoff | |
| 3,824,675 | 7/1974 | Ballantyne | |
| 3,935,772 | 2/1976 | Demus et al. | |
| 4,375,774 | 3/1983 | Wilson et al. | 83/140 |

FOREIGN PATENT DOCUMENTS

| | | |
|---|---|---|
| 2708962 | 10/1977 | Fed. Rep. of Germany . |
| 571948 | 1/1958 | Italy ..................... 267/60 |
| 237871 | 8/1925 | United Kingdom . |
| 623915 | 5/1949 | United Kingdom . |
| 1111993 | 5/1968 | United Kingdom . |
| 1290461 | 10/1972 | United Kingdom . |
| 1543289 | 4/1979 | United Kingdom . |
| 1564936 | 4/1980 | United Kingdom . |

OTHER PUBLICATIONS

"Strippit BN Hole Punching Units", Houdaille Industries, 1969.

Primary Examiner—Frank T. Yost
Attorney, Agent, or Firm—Hill, Van Santen, Steadman & Simpson

[57] ABSTRACT

A preloaded spring assembly is disclosed having a compression coil spring received interior of a housing. The housing is made of opposed cup-shaped housing members having open ends with one of the cup-shaped members having a smaller diameter and having its open end projecting into the open end of the second housing member. The respective open ends are configured to provide a lock abutment preventing separation of the housing members beyond a certain dimension whereby the spring positioned interior of the housing members having its opposite ends in contact with the bottoms of the respective cup-shaped housing members is provided with a compressive preload. Also, disclosed is a method of manufacturing the preloaded spring assembly which configures the open ends to provide a mechanical interlock during assembly such that the spring is preloaded at the time of assembly.

32 Claims, 15 Drawing Figures

PUNCH PRESS ASSEMBLY INCLUDING A PRELOADED ENCAPSULTED SPRING

This application is a continuation-in-part application of U.S. Ser. No. 216,631, filed Dec. 17, 1980, entitled "Punch Press Assembly Including a Preloaded Encapsulated Spring and Method of Manufacture," which is a continuation-in-part application of U.S. Ser. No. 106,832, entitled "Preloaded Spring And Method of Manufacture," filed Dec. 26, 1979, and both now abandoned.

BACKGROUND OF THE INVENTION

1. Field of the Invention

This invention relates to encapsulated spring assemblies and more particularly to a punch press assembly having a preloaded encapsulated spring element.

2. Prior Art

Springs are used extensively in punching set ups for applying a force to a punch guide, or for separating the work piece from the die. Additionally, such springs are well-known in other machine environments where they may be used to bias two relatively movable members towards or away from one another. In certain instances it has been known to encase the spring in a protective housing either for safety purposes or to prevent the spring from being adversely affected by dirt and the like. Moreover, it is known in certain devices to provide a pre-load on a spring. For example, where springs are used between a housing and a part partially received in the housing and partially projectable from the housing, it is known to pre-load the spring at the time the part is assembled into the housing such that a desired initial bias is provided to the part.

Additionally, in the punching art, it has been known to provide punch assemblies wherein the punch is provided with a punch return spring or with a punch guide spring wherein the spring may be pre-loaded by the provision, for example, of an adjustable head on the punch.

SUMMARY OF THE INVENTION

Although each of the above designated features has been found individually in the art, the art has not thus far provided an inexpensive, multi-use, encapsulated pre-loaded spring assembly. In certain environments it is desired that the spring be received within a housing, for example, to confine spring pieces in the event of spring breakage. Further, it is frequently desired that the spring be provided with a predetermined preload so as to eliminate spring travel before attaining a usable spring pressure.

Additionally, it would be advantageous if encapsulated spring assemblies could be economically manufactured having a predetermined stack height at maximum permitted spring extension while also obtaining a preload at that point. It would also be advantageous to be able to provide an encapsulated spring assembly where the housing compresses along with the spring without opening any passageways to the interior of the spring housing.

It would further be advantageous to fixably mount such an encapsulated spring housing directly onto a stripper guide member in a punch press assembly to ensure proper alignment of the spring housing on the stripper lift surface.

It would further be an advance in the art to provide an inexpensive method of manufacturing preloaded encapsulated spring assemblies where the assemblies are manufacturable as multi-use stock devices.

It would additionally be of benefit to provide an inexpensive method of manufacturing encapsulated spring assemblies locked in place onto the stripper guide in a punch press assembly.

The present invention discloses an encapsulated preloaded spring assembly having each of the above desired features. In accordance with the invention the housing encapsulating the spring consists of opposed cup-shaped housing halves having open facing ends. The housing halves are telescopable together at their open ends. A compression spring is received interior of the housing halves and the open ends of the housing halves are thereafter matingly deformed to provide a separation lock preventing the housing halves from being pulled apart beyond a certain predetermined dimension. The dimension can be either with respect to a desired total maximum height of the assembly or with respect to a desired minimum preload. According to the preferred method of manufacture disclosed herein, the housing halves are deformed to lock them together at the time of assembly of the housing with the spring positioned interior of the housing.

In a first embodiment of the invention, telescoping inner and outer housing halves are provided with the inner housing half having an outer diameter with a first portion dimension which increases through an outwardly frusto-conical section adjacent its open end. The first dimension is less than the inner diameter of the second outer telescoping housing half. The second and outer telescoping housing half has a first portion inner diameter over a major axial length thereof, larger than the largest outer diameter of the telescoped portion of the inner housing half. The inner diameter of the outer housing half, at the time of assembly, is reduced through a frusto-conical section adjacent its open end after the housing halves have been overlapped. In this manner, the two housing halves will abut at their frusto-conical sections preventing separation of the two housing halves. The open end of the inner housing half axially beyond the frusto-conical section will preferably have an outer diameter equal to the inner diameter of the first portion of the outer housing half and the inner diameter of the outer housing half at the open end axially of the frusto-conical section will preferably have a dimension equal to the outer diameter of the first portion of the inner housing half. In this manner, the housing halves will be substantially sealed such that no flow path will be open between the inner and outer housing halves even when they are relatively telescoped towards one another.

The inner housing is provided with the frusto-conical enlargement adjacent the open end prior to assembly. Thereafter, by use of a constricting die, the outer housing half is circumferentially constricted at the time of assembly while the entrapped internal spring is preloaded.

In a second embodiment in the invention, rather than using frusto-conical sections, the inner and outer housing halves have their open ends respectively folded over outwardly and folded over inwardly into abutting relationship.

In a further form of the invention for use in a punch press assembly, one housing half of the inventive encapsulated spring assembly is formed at its bottom wall with an outwardly extending dovetail projection for interlocking with a corresponding dovetail recess located in the top wall lift surface of a stripper guide. A punch rod is threadably positioned adjacent the bottom wall of the other housing half and extends through the spring assembly, the dovetail interlock, and stripper for reciprocating movement during punching.

In assembly of the interlocking arrangement, the one spring housing is formed with an annular projecting wall of a diameter to be concentrically received in the female dovetail recess formed on the stripper. A wafer of a noncompressible, resilient material is then placed interiorly of the spring housing projecting wall and compressed to expand radially outward. The radial movement of the wafer serves to distend the projecting wall into a substantially mating, interlocked relationship with the dovetail recess sidewalls. Thereafter, pressure on the wafer is released such that the resilient material resumes its original shape and the wafer is removed. A spring is positioned in the open end of the one spring housing and the other spring housing half is fitted thereon to entrap and preload the spring.

In another embodiment of the invention for use in a punch press assembly, one half of the inventive encapsulated spring assembly is integrally formed on the upper surface of a stripper guide and a punch rod is secured to the bottom wall of the other housing half for extension through the spring assembly and stripper for reciprocating movement during punching. The open ends of the housing halves may be telescoped together with the spring positioned interior and matingly deformed during assembly of the spring system to provide a separation lock preventing the housing halves from being pulled apart beyond a certain predetermined dimension.

In a still further preferred form of the invention for use in a punch press assembly, the telescoping inner and outer housing halves lock together with the spring positioned interior and the bottom housing half is formed with a longitudinally projecting connector channel member having internal threads. The upper surface of a stripper guide is formed with a relatively narrowed connector head having external threads, such that the encapsulated spring assembly and stripper guide may be screwed together at the connector portions. A set screw is mounted in a radial bore formed in the connector channel member to frictionally lock the connector portions against slippage upon asembly. A punch rod extends through the spring assembly and stripper for reciprocating movement during punching.

It is therefore an object of this invention to provide an improved preloaded spring assembly.

It is another, and more particular, object of this invention to provide an improved pre-loaded spring assembly having a compression coil spring received interiorly of telescoping cup-shaped housing halves having deformed open ends providing an interference relationship preventing separation of the housing halves, and providing a circumferential seal between the housing halves.

It is still a further object of this invention to provide an improved punch press assembly having an encapsulated spring housing fixably centered on a stripper guide for supporting a punch rod extending through the spring housing and stripper.

Although the teachings of my invention have herein been discussed with reference to specific theories and embodiments, it is to be understood that these are by way of illustration only and that others may wish to utilize my invention in different designs or applications.

DESCRIPTION OF THE PREFERRED EMBODIMENTS

Figures 1, 2, 3, 6:
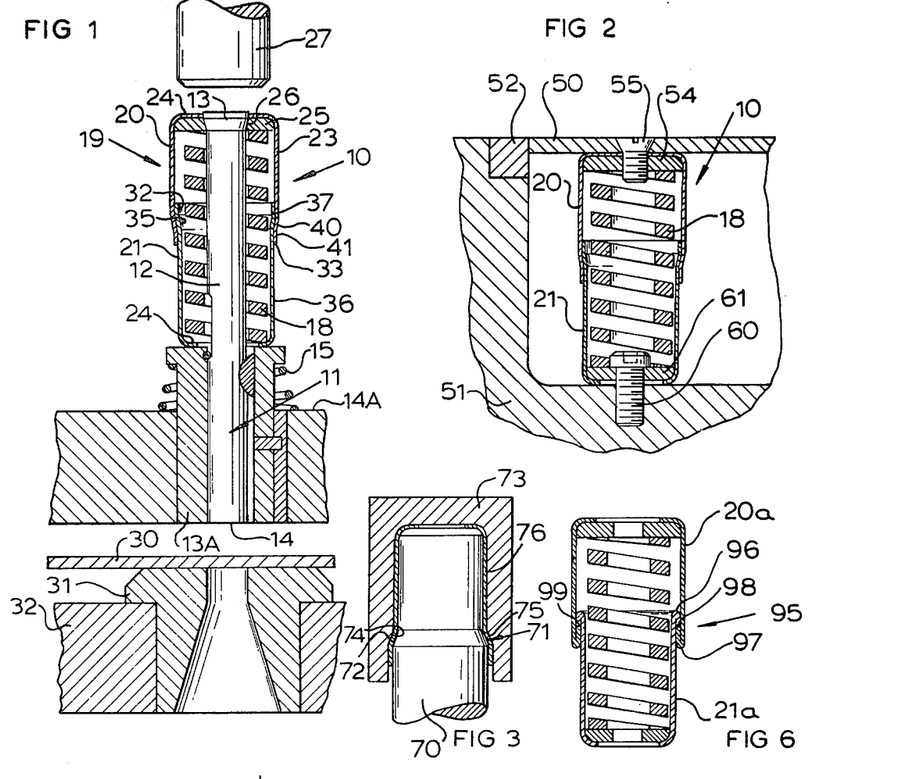
FIG. 1 is a fragmentary secrtional view of a punch and die assembly equipped with the spring assembly of this invention.
FIG. 2 is a fragmentary cross sectional view of a spring assembly of this invention used as a stripper.
FIG. 3 is a fragmentary cross sectional view of a first forming die assembly shown forming an inner housing half of the spring assembly of this invention.
FIG. 6 is a cross sectional view of a modified form of the spring assembly of this invention.

FIG. 1 illustrates the preloaded spring assembly 10 of this invention used in connection with a punch. The punch 11 has a body 12 with an enlarged head end 13 and a working tip 14 on the body end opposite the head end. The punch 11 is received through a stripper 13A. The stripper 13A is in turn mounted in a punch assembly holder 14A which may, for example, be a punch turret of a turret punch press. A lifter spring 15 lifts the stripper 13A and punch 11. The spring assembly 10 is, in the illustrated embodiment, used as a stripper spring assembly and includes a compression coil spring 18 received within a housing 19. The housing consists of outer 20 and inner 21 cup-shaped housing halves each including a peripheral wall 23 and a bottom wall 24. In the embodiment illustrated, the bottom wall 24 may have apertures therethrough through which the punch body 12 projects. A washer member 25 received in the bottom of the outer housing half 20 has a central aperture 26 which engages the enlarged head 13 of the punch. A ram 27 is provided to activate the punch to force it through a workpiece 30 and into a mating die 31 received in a die holder 32 which may, for example, be the die turret of a turret punch press.

Each of the housing halves 20 and 21 has an open end with the open end 32 of the inner housing projecting into the open end 33 of the outer housing half. The housing halves undergo a circumferential change adjacent the open end with the inner housing half 21 being circumferentially enlarged through a frusto-conical section 35 extending outwardly from the main diameter portion 36 and then terminating in an axial section 37 which continues from the frusto-conical section 35 to the open end 32. Conversely, the outer housing half has a diameter decreasing frusto-conical section 40 which extends inwardly and terminates in an axial extension 41 which in turn terminates in the open end 33.

Preferably, the diameters of the two housing halves are chosen such that their peripheral wall at the open ends engage respectively the inner diameter of the main or full diameter section of the outer housing and the outer diameter of the main or full diameter section of the inner housing. In this manner, no leakage paths are open between the two housing halves and the housing halves are capable of telescoping movement to further compress the spring. However, due to the interference created by the frusto-conical section, the amount by which the housing halves can be separated from one another is limited. To the extent that the axial stack height of the telescoped inner and outer housing halves is limited by engagement of the frusto-conical sections to a total dimension less than the free dimension of the spring 18, the spring will be in a preloaded state.

FIG. 2 illustrates the spring assembly 10 of this invention when used in connection with a stripper plate construction including a stripper plate 50, a die base 51 and a cutting die edge 52. The spring assembly 10 is received in a space between the die base 51 and the stripper plate 50 and is used to urge the stripper plate outwardly to strip material cut or punched by the assembly. In such a construction it is desired to have a preload on the spring 18 while maintaining a fixed maximum stack height of the assembly. In this construction, a threaded washer 54 at the bottom of the outer housing half 20 can receive a taper headed bolt 55 for attachment to the stripper plate 50 whereas a threaded bolt 60 bottomed against a washer 61 received in the bottom of the housing half 21 can be used to attach the assembly to the base 51. By removal of the bolt 55, access with an allen wrench or the like can be had to the head of bolt 60 interior of the housing. Once the bolts are in place, the housing is substantially leak proof, at least for viscous fluids, due to the engagement of the inner diameter of the outer housing half with the outer diameter of the inner housing half. It can be seen that by providing an axial constant diameter section beyond the frusto-conical sections extending to the open ends, that a relatively long seal face is maintained adjacent both open ends during compression of the spring assembly.

This feature allows the spring assembly to function as a lubricant storer if desired whereby, for example, in connection with the punch of FIG. 1, lubricant can be stored within the interior to aid in lubricating the punch 12. Additionally, in connection with FIG. 2, lubricant can be relied upon to aid in helping to dissipate heat created by flexure of the spring 18.

FIG. 3 illustrates one method of manufacture of the inner housing half. A male die member 70 having a desired outer configuration 71 with a frusto-conical section 72 cooperates with a female die 73 having a desired inner cnfiguration 74 to form the circumferential expansion section 75 of the inner housing half 76.

Figure 4:
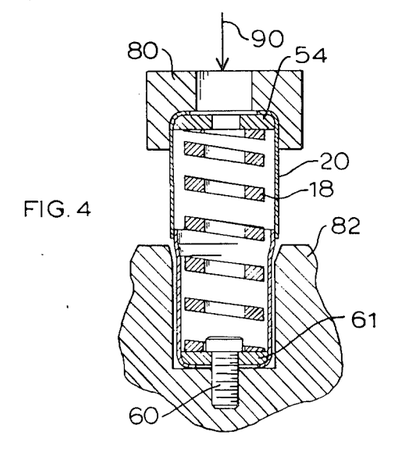
FIG. 4 is a fragmentary sectional view of an assembly operation assembling the spring assembly of this invention and final forming the outer housing half.
Figure 5:
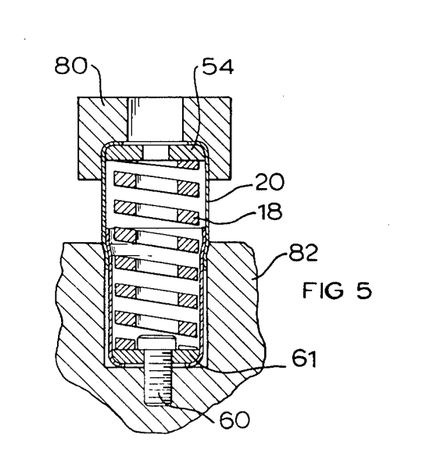
FIG. 5 is a view similar to FIG. 4 illustrating a further step in the assembly process.

Once the inner housing half has been formed, a die apparatus such as shown in FIGS. 4 and 5, can be used for forming the outer housing half which has previously been formed to a cup-shaped configuration. The housing halves may be initially manufactured of tubular material such as tubular steel. Once the components such as the spring 18 and top 54 and bottom 61 washers as well as, in the embodiment of FIG. 2, the bottom bolt 60 are inserted into the housing halves, the housing halves are telescoped onto one another. Thereafter a ram die 80 can be used to compress the spring 18 forcing the outer housing half against the deforming die 82 to deform the open end of the outer housing half substantially as shown in FIG. 5. The pressure applied in the direction of the arrow 90 may be in one or more testing steps to achieve a desired set spring preload. However, where deformation of the outer housing is accomplished in a single step, it is preferred that the minimum deformation pressure of the housing wall should exceed the maximum obtainable preload at that point of spring compression. This insures against accidental separation of the housing halves. Alternatively, the movement of the member 80 can be dimensionally controlled to provide a desired stack height. By use of dies or constricting members such as shown in FIGS. 4 and 5, the two housing halves may be moved towards one another as far as is necessary to achieve the desired spring preload and/or stacking height since the amount of telescoped overlap of the housing halves is not predetermined. The frusto-conical engaging sections can be formed at any point along the length of the peripheral wall of the outer housing member since the circumferential construction which forms the frusto-conical engaging section is axially continuous so long as the housing half 20 is being moved into the constricting die 82. The only effect of further movement is to increase the axial section 41.

FIG. 6 illustrates a modified form of the invention where the spring assembly 95 has the open ends 96 and 97 respectively of the housing halves 20A and 21A folded back.

In the embodiment of FIG. 6 the inner housing member 21A has its open end 96 folded through a reversed end outwardly to provide a ledge face 98 circumferentially around the exterior of the housing half 21A and facing away from the open end 96. The open end 97 of the outer housing half 20A is folded back upon itself inwardly to provide a ledge face 99 circumferentially around the inner diameter of the housing half 20A facing away from the open end 97. In this manner, the ledge faces 98 and 99 will abut one another preventing separation of the housing halves. The reverse bends of the open ends 96 and 97 can be formed by standard die techniques. Again the outer housing may have a reverse bend formed at the time of assembly in subtantially the same manner as shown in FIG. 4 but with a reverse bend forming die in place of the die 82.

It can therefore be seen from the above that my invention provides a preloaded spring assembly wherein a compression coil spring is received interior of two telescoping housing halves which are locked together by mechanical interference fit adjacent their open ends caused by circumferential deformation of the open ends providing opposed engagable circumferential faces, the housing halves being telescopable into one another and the opposed engagable faces limiting the separation of the housing halves.

Figure 7:
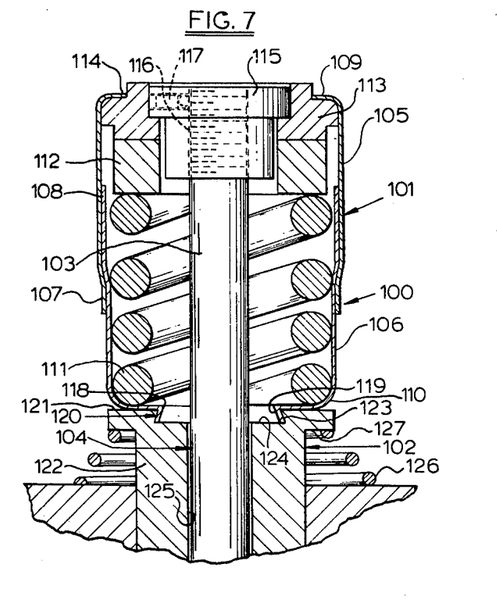
FIG. 7 is a fragmentary sectional view of a punch assembly with the encapsulated spring assembly fixably mounted onto a stripper guide.

In connection with a punch press assembly such as shown in FIG. 1, the present invention further provides for an interlocked assembly 100, as illustrated in FIG. 7, of an emcapsulated spring housing 101 and stripper guide 102. This relation enhances proper alignment of the spring housing on the stripper lift surface. The spring housing is formed with outer 105 and inner 106 cup-shaped halves having respective outer 107 and inner 108 frusto-conical free ends telescoping together in the manner described above and respective bottom walls 109 and 110. Inside the spring housing, a coil spring 111 is in a preloaded state. The lower end of the spring 111 rests against bottom wall 110; while the upper end of the spring abuts against a spacer ring 112 which is pressed against a fitting ring 113. The fitting ring is positioned in a central aperture 114 of the outer housing half bottom wall 109 and supports a mounting head 115 for support of the punch rod 104.

The punch rod body 103 has a threaded upper end for engagement in a central threaded channel 116 formed in the head 115. This thread connection permits selective vertically adjustable positioning of the rod in the assembly 100, such positioning being controlled by a detent element 117.

The punch rod body extends coaxially downwardly through the spring housing and through a central opening 118 in the bottom wall 110. The opening 118 is annularly bounded by a male dovetail shaped projecting wall 119 which interlocks in mating fashion with a dovetail recess 120 formed on the top wall lift surface 121 of the stripper body 122. The recess is defined by an annular upwardly convergent sidewall 123 and a planar bottom surface shelf 124 through which extends a central passage 125. The passage 125 passes axially through the stripper body to slideably contain the puncher rod body. A lifter spring 126 extends concentrically about the stripper in upper engagement with an overhanging lip portion 127. The assembly 100 operates in a fashion as described above in connection with FIG. 1 as those skilled in the art will readily appreciate.

Figure 8:
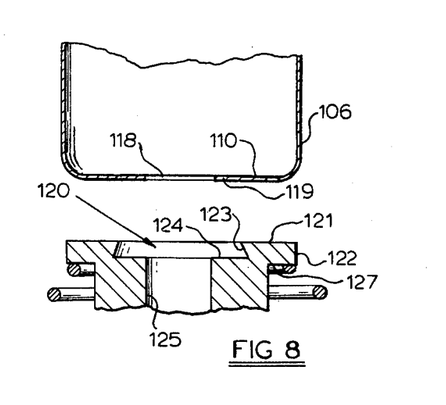
FIG. 8 is a fragmentary cross sectional view of opposed interlocking male and female surfaces on one spring housing half and the stripper in a first stage of assembly.

FIGS. 8-11 illustrate a method of manufacturing the interlocked assembly 100. With reference to FIG. 8, the inner housing half 106 is initially empty and open-ended. The projecting wall 119 formed on the housing half begins as a radially inward annular wall extension of the bottom wall 110.

Figure 9:
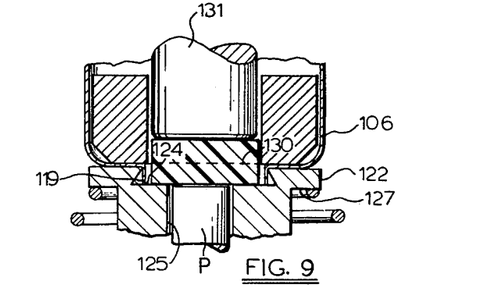
FIG. 9 is a fragmentary cross sectional view of the spring housing half and stripper concentrically fitted together with a wafer of resilient material positioned centrally thereof to be compressed in a further stage of assembly.
Figure 10:
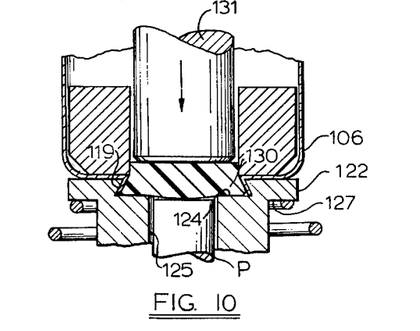
FIG. 10 is a fragmentary cross sectional view of the resilient wafer being compressed radially outward to distend the spring housing male surface into mating, interlocking relation with the stripper female surface in a later stage of assembly.

As shown in FIGS. 9 and 10, the dovetail interlock is formed by initially disposing a wafer-like piece 130 of noncompressible but resilient material, such as urethane, on the upper surface of the initially laterally disposed wall 119. The original wafer diameter is preferably substantially less than that of the recess opening 120 but larger than the diameter of the passage 125. A compression element, such as ram 131, is applied downwardly against the top of the wafer 130. As shown in FIG. 9, this action bends the wall surface 119 vertically downward relative to the bottom wall 110 of the spring housing half 108 toward the shelf 124.

In order to assure further compressive force on the wafer projects the wafer laterally outward against the wall surface 119 rather than vertically downward into the passage 125, a solid right-cylindrical plug P is inserted into the passage 125 such that its upper end is flush with the shelf 124. Accordingly, the wafer 130 is disposed in the recess 120 substantially fully supported along its bottom surface against further downward vertical movement.

As shown in FIG. 10, the ram 131 is then moved downward again against the wafer 130 causing the wafer to bulge laterally outward against the downturned wall 119. This action distends the wall 119 into a substantially contiguous or mating relation with the sidewall 123 thereby making a dovetail interlock.

Figure 11:
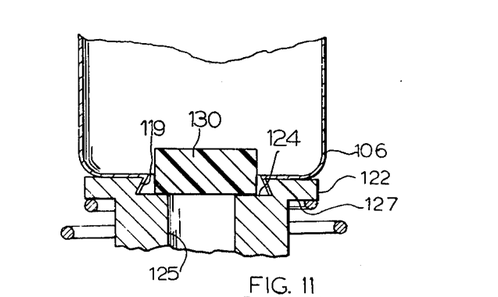
FIG. 11 is a fragmentary cross sectional view after compression of the resilient wafer has been removed and the spring housing and stripper mating surfaces are interlocked.

When the interlock is complete, as illustrated in FIG. 11, the ram pressure is released. The wafer reverts back to its original shape for easy removal from the recess 120. Thereafter, the spring 111 is positioned in the inner housing half 106 and the outer housing half 105 is fitted thereon to form the encapsulated spring housing in the manner heretofore described.

Figure 12:
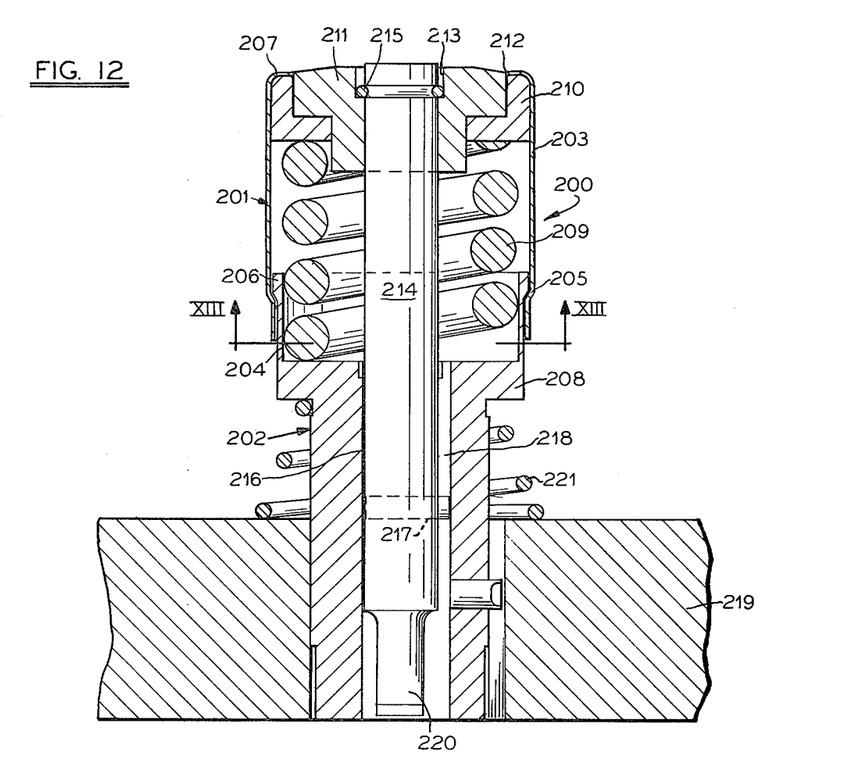
FIG. 12 is a sectional view of a punch assembly with the encapsulated spring assembly having a lower housing integrally formed on a stripper guide.
Figure 13:
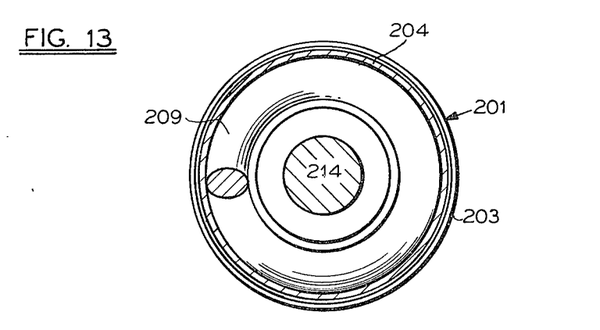
FIG. 13 is a cross-sectional view taken along lines XIII—XIII of FIG. 12.

With reference to FIGS. 12-13, the present invention further provides for an interlocked spring punch and stripper assembly 200 of an encapsulated spring housing 201 and stripper guide 202 for use in a punch press assembly such as shown in FIG. 1 wherein a portion of the spring housing is integrally formed on the stripper guide. The stripper guide 202 is in the form of a generally cylindrical hollow stem adapted to be mounted for reciprocation in a punch press holder. The spring housing is formed with outer 203 and inner 204 tube-shaped halves having respective outer 205 and inner 206 frusto-conical open free ends telescoping together in the manner previously described. The outer housing half 203 is a separate piece closed off at one end by a partial radial wall portion 207; whereas the inner housing half 204 is integrally formed on the upwardly facing end of the stripper guide 202 such that a relatively enlarged end surface 208 of the stripper serves as a radial wall closing off one end of the housing half 204. By integrally forming one spring housing half with the stripper guide 202, possible slippage and wear problems are avoided which may normally arise in cyclical punching operations where a punch assembly stripper and spring housing are wholly separate pieces or mechanically interconnected.

Inside the spring housing 201, a coil spring 209 is in a preloaded state. The lower end of the spring 209 rests against the stripper end portion 208. The upper end of the spring abuts against a punch support means comprising a spacer ring 210 positioned adjacent the outer spring housing half wall 207 and a fitting ring 211 positioned in a central aperture 212 of the housing bottom wall 207 peripherally enclosed by the spacer ring 210. The fitting ring is formed with an axially extending central channel 213 for receiving the upper or head end of a downwardly extending punch rod 214. A press fit ring 215 surrounding the head end of the punch rod serves to frictionally mount the punch rod 214 into connection with the fitting ring, which connection means permits selective vertically adjustable positioning of the rod in the assembly 200. The entire spring punch and stripper assembly 200 is thus retained together as a single unit.

The punch rod extends coaxially downward through the spring housing 201, interiorly of the spring 209, and into a channel opening 216 running fully through the stripper guide 202. The stripper channel 216 slidably contains the punch rod 214 and a transverse pin 217 mounted in the rod has one end extending into a guide recess 218 formed in the stripper parallel to the channel 216 to maintain the vertical alignment of the rod during reciprocation relative to the stripper. The stripper body 202 of the assembly 200 is suitably mounted for vertical reciprocation in a holder wall 219.

The lower free end of the punch rod 214 is formed with a suitable punch tool 220. A lifter spring 221 extends concentrically about the portion of the stripper 202 rising above the holder wall 219 and between the wall 219 and the overhanging undersurface of the enlarged end portion 208 to bias the stripper to a normal retracted state position as shown in FIG. 12. The spring punch and stripper assembly 200 operates in the holder wall 219 in a fashion as described above in connection with FIG. 1 as those skilled in the art will readily appreciate.

The integral stripper guide 202 and inner spring housing half 204 is a single piece turned component. The upper spring housing portion serves as the outer housing half 203 so as to allow the outer housing 203 to be formed around the inner housing half 204 during preloading encapsulation of the spring assembly 201. The method of manufacture for accomplishing this is to insert both the integral guide and inner housing half and the outer housing half 203 into a tapered die in the manner as shown in FIGS. 4 and 5. As the encapsulated spring 209 is preloaded by relative downward movement of the outer housing half 203, the outer housing frusto-conical free end 205 is formed telescoping about the inner housing frusto-conical free end 206 and compressed in the tapered die to form an interference stop with the inner frusto-conical portion 206 limiting the amount by which the opposed bottom walls of the spring housing halves 203 and 204 can be separated under action of the spring 209. As previously discussed, the housing halves 203 and 204 are capable of telescoping movement compressing the encapsulated coil spring, but the axial stack height of the telescoped inner and outer housing halves is limited by engagement of the frusto-conical sections 205 and 206 to a total dimension less than the normal free state extension of the spring.

Figure 14:
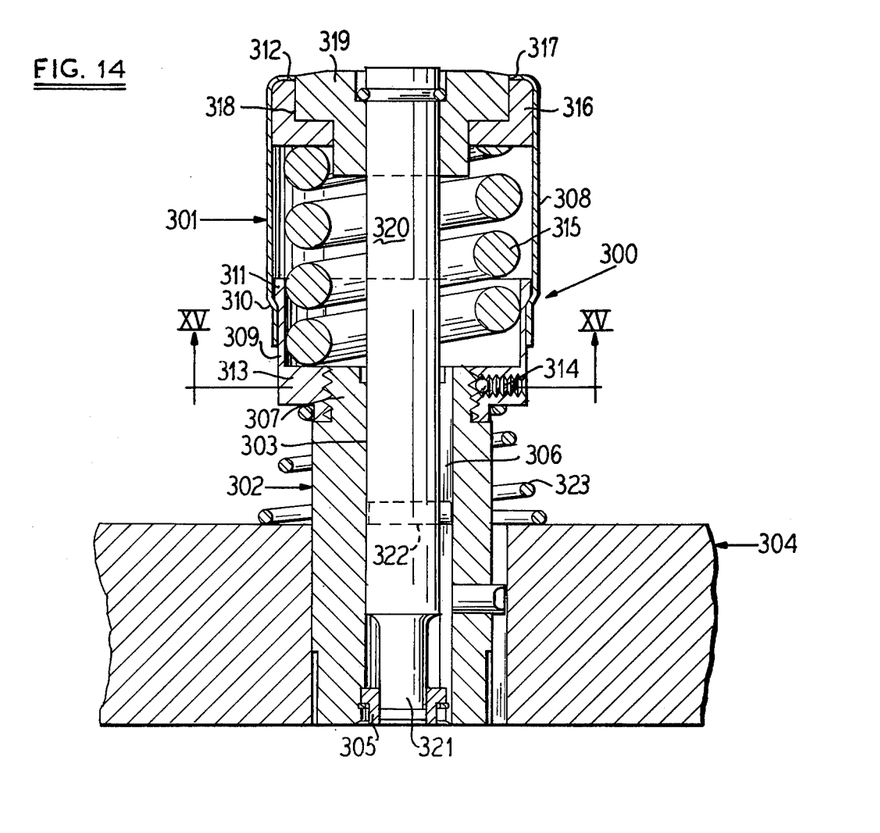
FIG. 14 is a sectional view of a two-piece punch assembly wherein separate encapsulated spring assembly and stripper guide pieces are screwed together.
Figure 15:
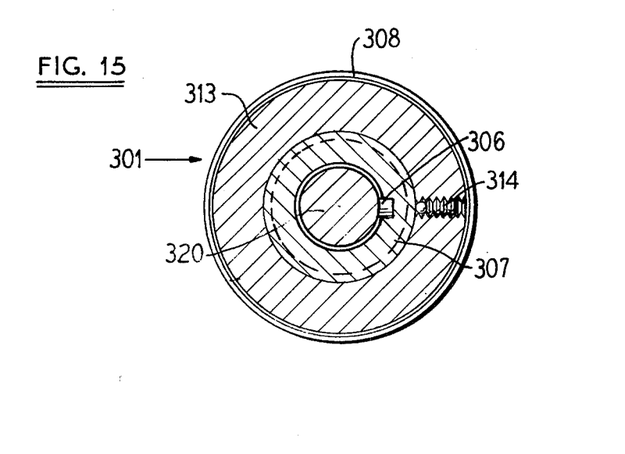
FIG. 15 is a cross-sectional view taken along lines XV—XV of FIG. 14.

FIGS. 14–15 illustrate a still further preferred interlocked form of the invention for use in a punch press assembly. An interlocked spring punch and stripper assembly 300 is comprised of two separately manufactured pieces, namely an encapsulated spring housing 301 and a stripper guide 302. The stripper guide 302 is in the form of a generally cylindrical stem having a throughbore 303 and adapted to be mounted for reciprocation in a punch press holder 304. The lower open end of the stripper throughbore 303 contains a hollow guide ring 305 mounted therein. The throughbore 303 may be formed with a longitudinal keyway slot or deformation 306 as shown in FIG. 14 in instances where a shaped punch must be prevented from turning in the stripper guide or may be completely cylindrical in cases, such as a rounded punch, where there is no concern with punch turning. The upper end of the stripper is formed with a connector head portion 307 preferably of reduced diameter relative to the remainder of the stem. The head 307 is provided with screw threads which, in accordance with the preferred embodiment, are exterior of the head, for reasons explained below.

The spring housing 301 is formed with outer 308 and inner 309 tube-shaped halves having respective outer 310 and inner 311 frusto-conical open free ends telescoping together in the manner previously described.

As previously discussed, the spring housing halves 308 and 309 are capable of telescoping movement compressing the encapsulated coil spring, but the axial stack height of the telescoped inner and outer housing halves is limited by engagement of the frusto-conical sections 310 and 311 to a total dimension less than the normal free state extension of the spring. The outer housing half 308 is a separate piece closed off at its upper free end by a partial radial wall portion 312. The inner housing half 309 is a separate piece and, since it is the bottom portion of the spring housing, is closed off at its lower free end by a longitudinally projecting connector channel member 313. The channel member 313 is formed with counterpart screw threads, which here are formed internally along the channel bore, to permit the channel member 313 to be screwed together in a releasable threaded engagement with the head portion 307 of the stripper guide. By virtue of this screw fastening assembly of the spring housing 301 with the stripper guide 302, the punch and stripper assembly 300 can function in the manner of an integral or single unit, thus maintaining proper vertical alignment of the parts and avoid slippage and wear problems between the spring housing and stripper. The screw fastened arrangement further permits the operator to conveniently interchange spring housing or stripper parts in the assembly 300 in accordance with the particular punching requirements. A radially directed adjustable set screw 314 is set in a suitable threaded bore in the connector channel member to act as a friction lock against slippage upon fastening together of the connector portions 307 and 313.

Inside the spring housing 301, a coil spring 315 is in a preloaded state. The lower end of the spring 315 rests against the upper surface of the channel member 313. The upper end of the spring abuts against a punch support means comprising a support or spacer ring 316 positioned adjacent the outer spring housing half wall 312 concentric with a free end aperture 317 defined by the outer half end wall 312. The support ring is formed with a step-shaped axially extending central passage 318 for supporting the relatively enlarged head end 319 of a downwardly extending punch rod 320. It will be appreciated that the head end 319 of the punch rod in the spring housing 301 is shown here to be arranged in the manner described above in connection with FIG. 12.

The punch rod extends coaxially downward through the spring housing 301, interiorly of the spring 315, through the bore of the connector channel member 313 and fully into the stripper guide 302. The lower free end of the punch rod 320 is formed with a suitable punch tool 321 which is received for reciprocable movement in the guide ring 305. The stripper throughbore 303, slidably contains the punch rod 320 and a transverse pin 322 mounted in the rod has one end extending into the keyway slot 306 formed in the stripper to maintain the vertical alignment of the rod during reciprocation relative to the stripper. The stripper stem 302 of the assembly 300 is suitably mounted for vertical reciprocation in the holder wall 304.

A lifter spring 323 extends concentrically about the portion of the stripper 302 rising above the holder wall 304 and between the holder and the overhanging undersurface of the connector member 313 to bias the stripper to a normal retracted state position as shown in FIG. 14. The spring punch and stripper assembly 300 operates in the holder 304 in a fashion as described above in connection with FIG. 1 as those skilled in the art will readily appreciate.

Although various minor modifications may be suggested by those versed in the art, it should be understood that I wish to embody within the scope of the patent warranted hereon all such modifications as reasonably and properly come within the scope of my contribution to the art.

I claim as my invention:

1. Improved apparatus for use in a punch press assembly comprising a punch rod supported for reciprocable movement in an interlocked spring assembly and stripper guide, said spring assembly comprising first and second housing halves each having a circumferential peripheral wall, a partially closed bottom wall, and an open end spaced by the peripheral wall from the bottom wall, the first housing half having its open end telescopically received interior of the open end of the second housing half for encapsulating and pre-loading a spring positioned interior of the housing halves for urging the housing halves in an axial direction away from one another, the housing halves having circumferential engaging surfaces adjacent their open ends limiting axial movement of the housing halves away from the one another but allowing movement of the housing halves in the direction towards one another, the bottom wall of one housing half containing means for supporting an upper free end of the punch rod and the other housing half bottom wall having a central aperture through which the punch rod extends, said other housing half bottom wall and an upper surface of said stripper guide having mating interlock means for joining together the spring assembly and stripper guide, and the stripper guide having a central passage coaxial with the central aperture for receiving a lower free end of the punch rod therethrough.

2. The improved apparatus of claim 1, wherein the interlock means comprises a dovetail-shaped peripheral wall, projecting downward from the other housing half bottom wall and fitted in a substantially corresponding dovetail shaped recess formed in the upper surface of the stripper guide.

3. The improved apparatus of claim 1, wherein the interlock means comprises a threaded channel member projecting downward from the other housing half bottom wall about said central aperture and a threaded head portion formed on the upper surface of said stripper guide for screwing together with said channel member.

4. The improved apparatus of claim 3, wherein said channel member is formed with interior threads and said head portion is formed with exterior threads.

5. The improved apparatus of claim 4, wherein said interlock means further comprises releasable means for frictionally locking together said channel member and head portion.

6. The improved apparatus of claim 1, wherein the circumferential engaging surfaces are opposed frusto-conical diameter sections of the peripheral walls of the housing halves.

7. The improved apparatus of claim 6, wherein the frusto-conical section of the first housing half increases the outer diameter thereof and the frusto-conical section of the second housing half decreases the inner diameter thereof.

8. The improved apparatus of claim 7, wherein the other housing half is the first housing half.

9. A punch assembly comprising an elongated punch having an enlarged head at its upper end, a generally cylindrical stripper means supported for reciprocation in a holder wall, said stripper means having a longitudinal passage therethrough for receiving the lower end of said punch, and an encapsulated spring assembly mounted between an upper surface of said stripper and said punch head for resiliently supporting the upper end of said punch above said stripper, said spring assembly having first and second housing halves each having a circumferential peripheral wall and at least partially closed bottom wall and an open end spaced by the peripheral wall from the bottom wall, the first housing half having an outer diameter smaller than the inner diameter of the second housing half, the first housing half having its open end telescopically received interior of the open end of the second housing half, a loaded spring received interior of the housing halves operatively abutting the bottom walls thereof to urge the housing halves away from one another, the housing halves having mating circumferentially engaging faces spaced from their bottom walls engageable by movement of the housing halves axially with respect to one another, the faces limiting axial movement of the housing halves with respect to one another in a direction away from one another but allowing movement of the housing halves in the direction towards one another, said punch extending through a central aperture in one housing half bottom wall into said stripper passage.

10. The punch assembly of claim 9, wherein said spring is in the form of a coil concentric about said punch.

11. The punch assembly of claim 9, wherein the faces are opposed surfaces of frusto-conical diameter changing sections of the peripheral walls of the housing halves, the frusto-conical section of the first housing half increasing the outer diameter thereof, the frusto-conical section of the second housing half decreasing the inner diameter thereof.

12. The punch assembly of claim 9, wherein the faces are axial end faces of folded over portions of the peripheral wall, the first housing half having its open end folded over and backwardly radially outwardly of remaining portions of the peripheral wall, the second housing half having the peripheral wall adjacent the open end thereof folded over and backwardly radially inwardly.

13. A preloaded spring punch and stripper assembly comprising first and second housing members, each housing member including a substantially tubular peripheral wall with an internal partial radial wall portion and an open end at a first axial end of the peripheral wall, the first housing member having a maximum outer diameter less than a maximum inner diameter of the second housing member, the open end of the first housing member inserted into the open end of the second housing member, the first and second housing members being telescopically axially movable, an outer diameter increasing section of the first housing member adjacent the axial end of the first housing member, an inner diameter decreasing section of the second housing member intermediate axial ends thereof and adjacent the first axial end, the sections abutable with one another and the abutment preventing removal of the first housing member from the second housing member, a spring received interior of said housing members, the spring having a free spring height greater than a maximum axial internal height of the housing members when the sections are abutted whereby the spring is preloaded, a punch having a head end received in the second housing member and a lower end extending therethrough, a stripper carried by the first housing member projecting from the partial radial wall thereof in a direction opposite the second housing member and encircling the punch lower end remote from the head end, means supporting the head end of the punch by an abutment member received interiorly of the second housing half, the spring acting against the abutment member urging the abutment member into contact with the partial radial wall of the second housing member and lifting the punch within the stripper, and means for retaining the entire assembly of stripper, encapsulated spring, and housing members together as a single unit.

14. The assembly of claim 13, wherein said means for retaining comprises a dovetail-shaped peripheral wall, projecting downward from the partial radial wall portion of the first housing member and fitted in a substantially corresponding dovetail shaped recess formed in an upper surface of the stripper guide.

15. The assembly of claim 13, wherein said means for retaining comprises a threaded channel member projecting downward from the partial radial wall portion of the first housing member and a threaded head portion formed on an upper surface of said stripper guide for screwing together with said channel member.

16. The assembly of claim 15, wherein said channel member is formed with interior threads and said head portion is formed with exterior threads.

17. The assembly of claim 16, wherein said means for retaining further comprises releasable means for frictionally locking together said channel member and head portion.

18. A preloaded spring, punch and stripper assembly, the preloaded spring assembly including first and second telescoping housing members having cup shaped interiors defined by peripheral walls and partial bottom walls with the bottom walls of the first and second members being opposed to one another with a spring received interior thereof entrapped between the bottom walls, one of said housing members having an inner diameter greater than the outer diameter of the second of said housing members whereby the second of said housing members projects into the interior of the one housing member, the housing members having respectively radially outwardly extending and radially inwardly extending peripheral wall portions adjacent open ends thereof providing interference mating preventing separation of the parts and establishing a maximum stacked height less than the free length of the spring whereby the spring is preloaded interior of the housings characterized in that each housing half is provided with an axial opening for receipt for a punch, the punch extending through the preloaded spring assembly and projecting beyond the axial end of the second housing half, a stripper received around said projecting portion of said punch, the stripper being fixedly attached to the second housing half and aligned with the openings in the housing halves, the stripper having an axial bore therethrough receiving the punch, the movement of the punch in the preloaded spring assembly in a direction towards the stripper being limited by engagement of a head end of the punch with a portion of the assembly contacting an end of the spring, movement of the punch towards the stripper causing compression of the spring and relative movement of the telescoped housing halves towards one another and the housing halves, spring and stripper being retained together as a single unit.

19. The assembly of claim 18, wherein the spring is concentrically wound about the punch.

20. The assembly of claim 18, wherein free ends facing one another of the telescoping housing members are frusto-conically shaped.

21. The assembly of claim 18, wherein the stripper is fixedly attached to the second housing half and aligned with the openings in the housing halves by connection means formed on the bottom wall of said second housing half and an upper surface of said stripper which screw together.

22. The assembly of claim 21, the connection means includes releasable means to frictionally lock together the second housing half and stripper.

23. The assembly of claim 18, wherein the stripper is fixedly attached to the second housing half and aligned with the openings in the housing halves by means of the bottom wall of said second housing half being an integral upper surface of the stripper.

24. The assembly of claim 18, wherein the stripper is fixedly attached to the second housing half and aligned with the openings in the housing halves by a dovetail-shaped peripheral wall projecting downward from the second housing half bottom wall fitting in a substantially corresponding dovetail shaped recess formed in an upper surface of the stripper.

25. A preloaded spring punch and stripper assembly comprising a generally cylindrical stripper means having a longitudinal passage therethrough, a first housing including a substantially tubular peripheral wall integrally upstanding on an upper end surface of said stripper means with an open free end, a second housing including a substantially tubular peripheral wall with an internal partial radial wall portion and and open free end, said first and second housing free ends being telescoped and axially movable relative to one another, one free end having a maximum outer diameter less than a maximum inner diameter of the other free end, said one free end having an outer diameter increasing section and said other free end having an outer diameter decreasing section which sections abut with one another to prevent removal of the second housing from the first housing, a spring received interior of said first and second housings having a free spring height greater than a maximum axial internal height of the housings when said sections are abutted whereby said spring is preloaded, and a punch rod having a head end positioned in said second housing overlying said spring and a lower end extending into said stripper passage, the entire assembly retained together as a single unit.

26. The assembly of claim 25, further comprising support means for engaging the head end of said punch rod, said support means being positioned in said second housing between said radial wall portion and said spring.

27. The assembly of claim 25, wherein said spring is concentrically wound about said punch rod.

28. The assembly of claim 25, wherein said free end sections are frusto-conically shaped portions of said first and second housing peripheral walls.

29. The assembly of claim 25, wherein said first housing free end has its maximum outer diameter less than the maximum inner diameter of said second housing free end.

30. For use in a punch press assembly, a stripper guide means comprising a generally cylindrical stem portion, adapted to be mounted for reciprocation in a punch press holder and having a longitudinal passage therethrough for receiving a relatively reciprocable punch, and an encapsulated punch spring assembly connected with said stem portion having first and second housing members, each housing member including a substantially tubular peripheral wall and a longitudinally directed open free end, said first housing member being integrally upstanding on an upper surface of said stem portion, said second housing member free end telescopingly connected to said first housing member free end, said free ends being axially movable but having abutting sections to prevent removal of one housing member from the other, said second housing member further including an inward radial wall portion longitudinally opposed from its free end, and a spring received interior of said first and second housings having a free spring height greater than a maximum internal height of the housing members when said sections are abutted whereby said spring is preloaded.

31. The stripper guide means of claim 30, wherein said abutting sections are frusto-conically shaped portions of said first and second housing member peripheral walls.

32. The stripper guide means of claim 30, wherein said first housing free end having a maximum outer diameter less than a maximum inner diameter of said second housing free end.

* * * * *